United States Patent
Kawasaki et al.

(10) Patent No.: US 9,230,206 B2
(45) Date of Patent: Jan. 5, 2016

(54) IMAGE FORMING WITH SAVE MODE FOR REDUCING COLOR MATERIAL COST

(71) Applicant: KYOCERA Document Solutions Inc., Osaka (JP)

(72) Inventors: Tomohiro Kawasaki, Osaka (JP); Toru Nakayama, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/257,127

(22) Filed: Apr. 21, 2014

(65) Prior Publication Data

US 2014/0320878 A1    Oct. 30, 2014

(30) Foreign Application Priority Data

Apr. 24, 2013   (JP) .................................. 2013-091825

(51) Int. Cl.
| | |
|---|---|
| G06K 15/00 | (2006.01) |
| G06K 15/02 | (2006.01) |
| G06F 3/12 | (2006.01) |
| H04N 1/60 | (2006.01) |
| H04N 1/52 | (2006.01) |

(52) U.S. Cl.
CPC ............ *G06K 15/407* (2013.01); *G06F 3/1219* (2013.01); *G06K 15/1809* (2013.01); *G06K 15/1823* (2013.01); *H04N 1/52* (2013.01); *H04N 1/605* (2013.01)

(58) Field of Classification Search
CPC ............................... G06K 15/407; H04N 1/00
USPC ........................................... 358/1.13; 705/41
See application file for complete search history.

(56) References Cited

U.S. PATENT DOCUMENTS

| | | | | |
|---|---|---|---|---|
| 8,517,495 | B2 * | 8/2013 | Iritani | .................... B41J 11/009 347/105 |
| 2004/0085555 | A1 * | 5/2004 | Kato | .................... H04N 1/6022 358/1.9 |
| 2007/0024880 | A1 * | 2/2007 | Sato | .................... H04N 1/54 358/1.9 |
| 2013/0132273 | A1 * | 5/2013 | Stiege | ................ G06Q 30/0283 705/41 |

FOREIGN PATENT DOCUMENTS

JP    2006-231868 A    9/2006

* cited by examiner

*Primary Examiner* — Peter K Huntsinger
*Assistant Examiner* — Bharatkumar Shah
(74) *Attorney, Agent, or Firm* — James W. Judge

(57) ABSTRACT

An image forming apparatus includes an image forming unit, a save mode setting unit, a reference cost obtaining unit, a minimum monetary-sum extraction unit, and a usage volume setting unit. The minimum monetary-sum extraction unit is configured to extract a minimum monetary sum for each tone from reference costs for a plurality of image forming modes. The usage volume setting unit is configured to: obtain a post-reduction cost where a reduced monetary sum by the save mode is subtracted from the minimum monetary sum; and set reference usage volume as usage volumes for the dark color material and the light color material in the save mode, the reference usage volume being obtained based on the reference costs for the image forming modes corresponding to the post-reduction cost.

9 Claims, 19 Drawing Sheets

FIG. 3

| Tone Value | High Image Quality | | | Standard | | | High Speed |
|---|---|---|---|---|---|---|---|
| | Monotonic Increase = × | | | Monotonic Increase = ○ | | | ○ |
| | Light Ink | Dark Ink | Dark/light Sum | Light Ink | Dark Ink | Dark/light Sum | Dark Ink |
| 0 | 0 | 0 | 0 | 0 | 0 | 0 | 0 |
| 16 | 8 | 0 | 8 | 2 | 2 | 4 | 4 |
| 32 | 16 | 0 | 16 | 4 | 4 | 8 | 8 |
| 48 | 32 | 0 | 32 | 8 | 8 | 16 | 12 |
| 64 | 64 | 0 | 64 | 16 | 10 | 26 | 20 |
| 80 | 112 | 0 | 112 | 38 | 16 | 54 | 32 |
| 96 | 192 | 0 | 192 | 48 | 24 | 72 | 48 |
| 112 | 240 | 0 | 240 | 60 | 32 | 92 | 64 |
| 128 | 255 | 0 | 255 | 64 | 40 | 104 | 80 |
| 144 | 240 | 8 | 248 | 60 | 53 | 113 | 105 |
| 160 | 192 | 16 | 208 | 48 | 95 | 143 | 132 |
| 176 | 112 | 32 | 144 | 38 | 147 | 185 | 176 |
| 192 | 64 | 64 | 128 | 16 | 195 | 211 | 200 |
| 208 | 32 | 112 | 144 | 8 | 220 | 228 | 230 |
| 224 | 16 | 192 | 208 | 4 | 230 | 234 | 242 |
| 240 | 8 | 240 | 248 | 2 | 245 | 247 | 250 |
| 255 | 0 | 255 | 255 | 0 | 255 | 255 | 255 |

FIG. 4

| Tone Value | High Image Quality | | | Standard | | | High Speed | | Minimum Monetary Sum |
|---|---|---|---|---|---|---|---|---|---|
| | Light Ink | Dark Ink | Dark/light Sum | Light Ink | Dark Ink | Dark/light Sum | Dark Ink Only | | Dark/light Sum |
| 0 | 0 | 0 | 0 | 0 | 0 | 0 | 0 | | 0 |
| 16 | 80 | 0 | 80 | 20 | 10 | 30 | 20 | | 20 |
| 32 | 160 | 0 | 160 | 40 | 20 | 60 | 40 | | 40 |
| 48 | 320 | 0 | 320 | 80 | 40 | 120 | 60 | | 60 |
| 64 | 640 | 0 | 640 | 160 | 50 | 210 | 100 | | 100 |
| 80 | 1120 | 0 | 1120 | 380 | 80 | 460 | 160 | | 160 |
| 96 | 1920 | 0 | 1920 | 480 | 120 | 600 | 240 | | 240 |
| 112 | 2400 | 0 | 2400 | 600 | 160 | 760 | 320 | | 320 |
| 128 | 2550 | 0 | 2550 | 640 | 200 | 840 | 400 | | 400 |
| 144 | 2400 | 40 | 2440 | 600 | 265 | 865 | 525 | | 525 |
| 160 | 1920 | 80 | 2000 | 480 | 475 | 955 | 660 | | 660 |
| 176 | 1120 | 160 | 1280 | 380 | 735 | 1115 | 880 | | 880 |
| 192 | 640 | 320 | 960 | 160 | 975 | 1135 | 1000 | | 880 (960→880) |
| 208 | 320 | 560 | 880 | 80 | 1100 | 1180 | 1150 | | 880 |
| 224 | 160 | 960 | 1120 | 40 | 1150 | 1190 | 1210 | | 1120 |
| 240 | 80 | 1200 | 1280 | 20 | 1225 | 1245 | 1250 | | 1245 |
| 255 | 0 | 1275 | 1275 | 0 | 1275 | 1275 | 1275 | | 1275 |

FIG. 6

| Tone Value | Minimum Monetary Sum × 0.8 |
|---|---|
| 0 | 0 |
| 16 | 16 |
| 32 | 32 |
| 48 | 48 |
| 64 | 80 |
| 80 | 128 |
| 96 | 192 |
| 112 | 256 |
| 128 | 320 |
| 144 | 420 |
| 160 | 528 |
| 176 | 704 |
| 192 | 704 |
| 208 | 704 |
| 224 | 896 |
| 240 | 996 |
| 255 | 1020 |

FIG. 9

| Tone Value | High Image Quality<br>Monotonic Increase = × | | | Standard<br>Monotonic Increase = ○ | | | High Speed<br>○ |
|---|---|---|---|---|---|---|---|
| | Light | Dark | Dark/light Sum | Light | Dark | Dark/light Sum | Dark Ink |
| 0 | | | | 0 | 0 | 0 | 0 |
| 16 | | | | 2 | 1 | 3 | 3 |
| 32 | | | | 2 | 2 | 4 | 6 |
| 48 | | | | 3 | 3 | 6 | 10 |
| 64 | | | | 8 | 8 | 16 | 16 |
| 80 | | | | 9 | 9 | 18 | 26 |
| 96 | | Standard: Same As Save = On | | 10 | 10 | 20 | 38 |
| 112 | | | | 16 | 10 | 26 | 51 |
| 128 | | | | 35 | 13 | 48 | 64 |
| 144 | | | | 38 | 16 | 54 | 84 |
| 160 | | | | 48 | 24 | 72 | 106 |
| 176 | | | | 60 | 32 | 92 | 162 |
| 192 | | | | 60 | 32 | 92 | 162 |
| 208 | | | | 60 | 32 | 92 | 162 |
| 224 | | | | 60 | 50 | 110 | 180 |
| 240 | | | | 0 | 160 | 160 | 194 |
| 255 | | | | 0 | 204 | 204 | 204 |

IMAGE FORMING WITH SAVE MODE FOR REDUCING COLOR MATERIAL COST

CROSS-REFERENCE TO RELATED APPLICATION

This application is based upon, and claims the benefit of priority from, corresponding Japanese Patent Application No. 2013-091825 filed in the Japan Patent Office on Apr. 24, 2013, the entire contents of which are incorporated herein by reference.

BACKGROUND

Unless otherwise indicated herein, the description in this section is not prior art to the claims in this application and is not admitted to be prior art by inclusion in this section.

There is known an image forming apparatus, such as a printer and a digital multi-functional peripheral, employs, for example, light cyan, light magenta, gray, or a similar color as light ink in addition to cyan, magenta, yellow, and black as dark ink and achieves print of higher image quality.

Typical image forming apparatuses have a plurality of print modes (image forming modes) where usage volume of dark ink and light ink are different for the same tone. The print mode includes, for example, a high image quality mode, a standard mode, and a high speed mode. The high image quality mode relatively consumes much usage volumes of light inks while the standard mode relatively consumes little usage volumes of light inks. The high speed mode does not use light inks and uses darks ink only.

Selecting these print modes reduces usage volumes of light inks. Additionally, replacing the usage volume of light ink by the usage volume of dark ink, image degradation can be reduced while reducing the total ink usage volume.

Some of the typical image forming apparatuses have a function of save mode. The save mode reduces usage volumes of dark/light inks at a specified proportion and controls the proportion of reduction of dark/light inks. This further reduces the total ink usage volume while minimizing image degradation.

However, the save mode does not consider a unit price of dark/light ink. Therefore, even if the total ink usage volume can be reduced, the total ink costs for print may not hardly change.

For a plurality of print modes, for example, as illustrated in FIGS. 12A to 12C and FIG. 13, the total ink usage volume in the high image quality mode may be tremendously increased or decreased compared with the total ink usage volume in the standard mode and the high speed mode.

FIGS. 12A to 12C are graphs illustrating usage volumes of dark/light inks in each print mode. FIG. 13 illustrates extraction of the total ink usage volumes of dark/light inks from the graph in FIGS. 12A to 12C. In FIG. 13, the solid line indicates the total ink usage volume in each ordinary print mode in a mode other than the save mode while the dashed line indicates the total ink usage volume in each print mode in the save mode.

In this case, even if the high image quality mode is set to the save mode, as illustrated by the dashed line in FIG. 13, the total ink usage volume in the high image quality mode may be larger than the total ink usage volume of the ordinary standard mode and high speed mode that are not in the save mode in a region R1. In contrast, even if the standard mode and the high speed mode are set to the save mode, the total ink usage volume may be larger than the total ink usage volume of the ordinary high image quality mode that is not in the save mode in a region R2.

In view of this, even if any of the print modes are set to the save mode, the total ink usage volume is reduced in other print modes not in the save mode depending on a tone. Consequently, this may reduce the total ink cost.

SUMMARY

An image forming apparatus according to an embodiment of the present disclosure includes an image forming unit, a save mode setting unit, a reference cost obtaining unit, a minimum monetary-sum extraction unit, and a usage volume setting unit. The image forming unit is configured to reproduce tone with a dark color material and a light color material with different density, the image forming unit having a plurality of image forming modes where usage volumes of the dark color material and the light color material are different at identical tone among the plurality of image forming modes. The save mode setting unit is configured to establish a save mode where the usage volumes of the dark color material and the light color material for any of the plurality of image forming modes are changed so as to reduce total color material cost. The reference cost obtaining unit is configured to obtain a reference cost from unit prices of the dark color material and light color material with respect to reference usage volumes for the dark color material and the light color material set per tone in the plurality of image forming modes. The minimum monetary-sum extraction unit is configured to extract a minimum monetary sum for each tone from the reference costs for the plurality of image forming modes. The usage volume setting unit is configured to: obtain a post-reduction cost where a reduced monetary sum by the save mode is subtracted from the minimum monetary sum; and set reference usage volume as usage volumes for the dark color material and the light color material in the save mode, the reference usage volume being obtained based on the reference costs for the image forming modes corresponding to the post-reduction cost.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a tabular diagram illustrating an exemplary dark/light table according to the embodiment;

FIG. 4 is a tabular diagram illustrating an exemplary cost table according to the embodiment;

FIG. 6 is a tabular diagram illustrating a save mode cost table at post-reduction cost according to the embodiment;

FIG. 9 is a tabular diagram illustrating an exemplary tone reproduction table according to the embodiment;

DETAILED DESCRIPTION

Figure 1:
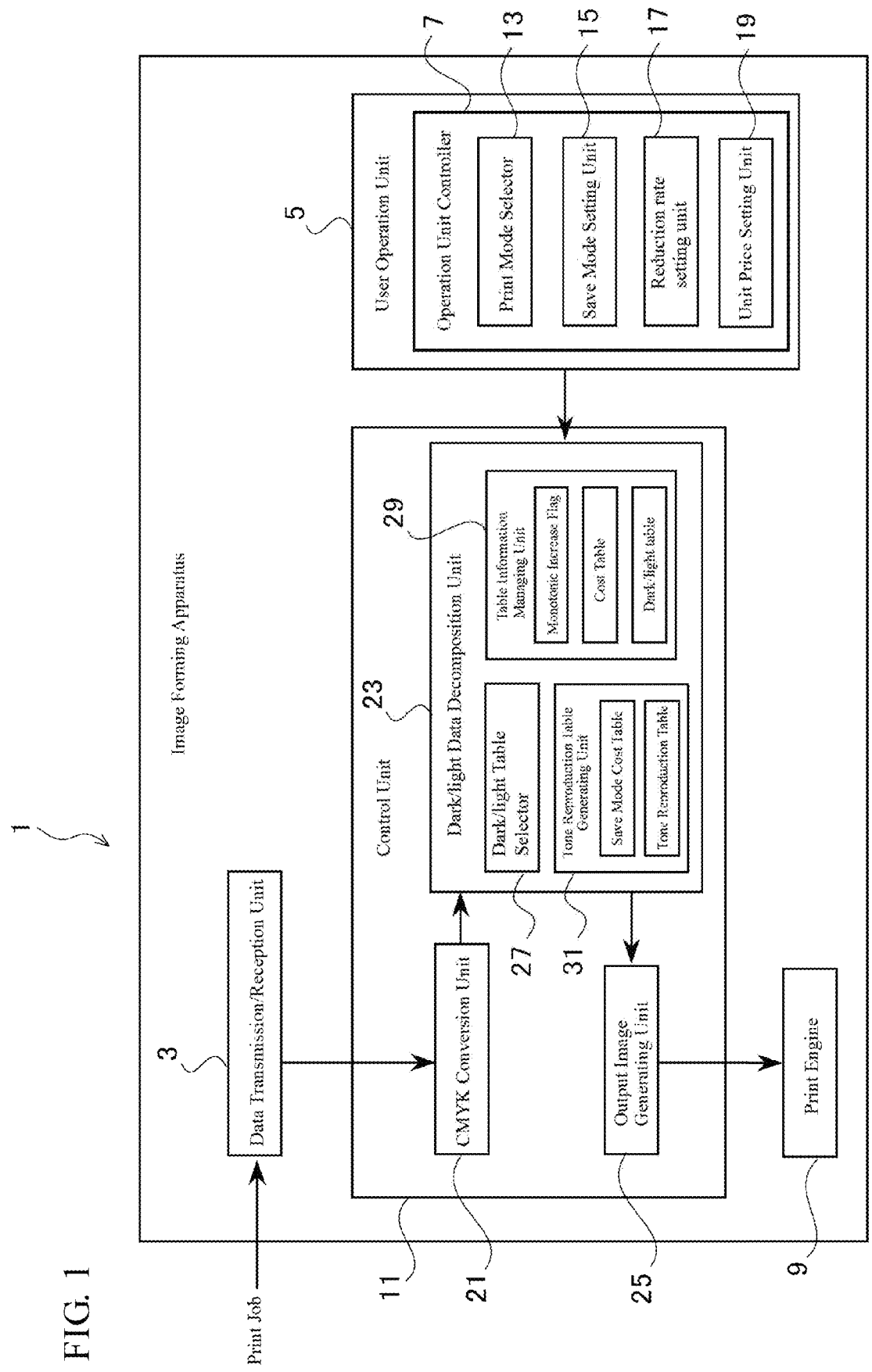
FIG. 1 is a schematic diagram illustrating a block configuration of an image forming apparatus according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An object to reliably reduce the total color material cost even if any of the image modes is set to a save mode is achieved by considering unit prices of dark color material and light color material.

Specifically, the reference cost is obtained from unit prices of the dark color material and the light color material with respect to the reference usage volume of the dark color material and the light color material set to each tone of a plurality of image forming modes. Then, the minimum monetary sum at each tone is extracted from the reference cost.

A post-reduction cost is obtained by subtracting reduced monetary sum due to save mode from the minimum monetary sum. Reference usage volumes obtained based on the reference cost in the image forming mode corresponding to the post-reduction cost are set as usage volume of a dark color material and a light color material in the save mode.

Insofar as tone reproduction is performed using dark/light color materials, the save mode is applicable to various image forming functions such as a print function, a copy function, and a facsimile function.

Schematic Configuration of Image Forming Apparatus According to the Embodiment

FIG. 1 is a schematic diagram illustrating a block configuration of an image forming apparatus 1. The image forming apparatus 1 of this embodiment includes, for example, a printer and a digital multi-functional peripheral. The image forming apparatus includes at least a print function. The print function receives a print job via a network such as LAN and performs printing based on the received print job.

The image forming apparatus 1 employs light ink such as light cyan, light magenta, and gray as a light color material in addition to dark ink of cyan, magenta, yellow, and black as a dark color material and achieves print of high image quality. The image forming apparatus 1 can set a save mode that changes usage volumes of dark/light inks to reduce the total ink cost during printing time. As dark/light color materials, dark/light toners may be used. However, in this embodiment, dark/light inks are employed for description.

The image forming apparatus 1 is, as illustrated in FIG. 1, includes a data transmission/reception unit 3, a user operation unit 5, a print engine 9, a control unit 11, or a similar unit.

The data transmission/reception unit 3 is an interface to send/receive data to/from an external terminal via a network such as LAN. A print job is received via the data transmission/reception unit 3.

The user operation unit 5 includes an operation unit controller 7 formed of a processor in addition to a keyboard, a touch panel, or a similar component. The user operation unit 5 causes the operation unit controller 7 to input an operation into the image forming apparatus 1 and to display the operating state. The operation unit controller 7 of this embodiment runs a save mode program (a dark/light color material setting program) in a Read Only Memory (ROM) or a similar memory to ensure operation input for the save mode. The details will be described later.

The print engine 9 forms (prints) an image on a paper sheet based on input image data. In this embodiment, the dark/light ink are employed as described above to ensure printing of high image quality.

The control unit 11 has a main control function to perform each above-described control. The control unit 11 includes a Central Processing Unit (CPU), a ROM, a Random Access Memory (RAM), or a similar memory. The CPU executes the program and serves as a main unit of a control operation function. The ROM stores the program operated by the CPU. The RAM serves as a work area. The control unit 11 has an image processing function in addition to the main control function. The image processing function generates image data for output (output image data) based on a print job and outputs the image data to the print engine 9. In this embodiment, executing the save mode program (the dark/light color material setting program) in the RAM or a similar memory ensures generation of output image data for the save mode by the image processing function.

Save Mode Function

The following describes the save mode function. The save mode function of this embodiment includes a table generation function and an output image data generation function. The table generation function generates a tone reproduction table in the save mode. The output image data generation function actually generates output image data for the save mode using this tone reproduction table.

User Operation Unit

The user operation unit 5 causes preset of the save mode for the table generation function. By execution of the save mode program (the dark/light color material setting program), the user operation unit 5 functions as a print mode selector 13, a save mode setting unit 15, a reduction rate setting unit 17, and a unit price setting unit 19.

This embodiment describes the user operation unit 5 located in the image forming apparatus 1. However, a printer driver of an external terminal such as a client PC can also function as the user operation unit.

The print mode selector 13 achieves a print mode selection function and causes a user to select a plurality of print modes (image forming modes). The plurality of print modes include, for example, a high image quality mode, a standard mode, and a high speed mode. Their usage volumes of dark ink and light ink differ for the same tone.

The high image quality mode is a first print mode where usage volume of light ink is relatively large. The standard mode is a second print mode that reduces usage volume of a light ink compared with the high image quality mode by replacing the usage volume with usage volume of dark ink so as to relatively reduce usage volume of the light ink. The high speed mode is a third print mode that does not use the light ink but uses the dark ink only.

Selection of these print modes appropriately ensures reducing the total ink usage volume while reducing image degradation.

Figure 2:
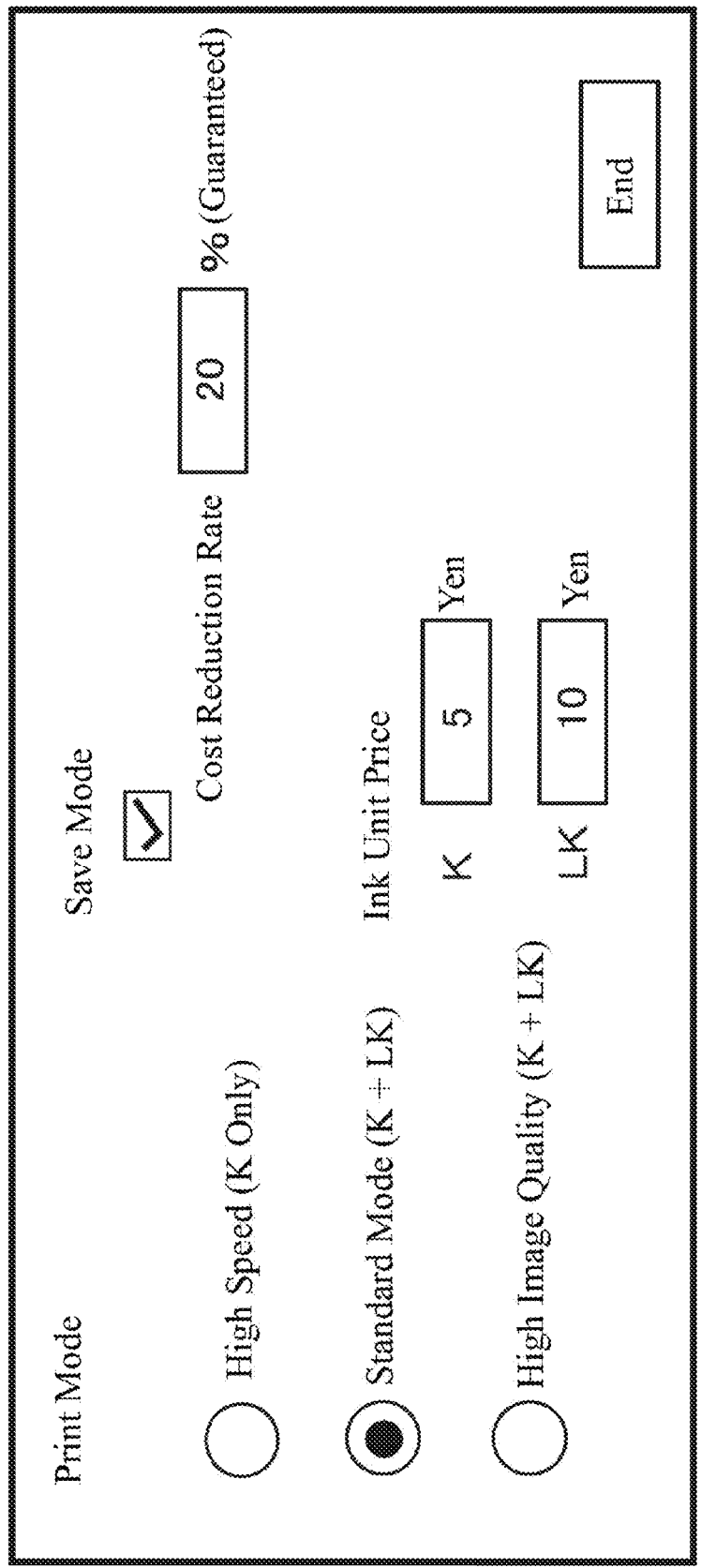
FIG. 2 is a schematic diagram illustrating an exemplary setting screen for a save mode displayed on an user operation unit of the image forming apparatus according to the embodiment.

FIG. 2 is a schematic diagram illustrating an exemplary setting screen for the save mode displayed on the user operation unit 5. The print mode selector 13 of this embodiment, as illustrated in FIG. 2, causes the user to select and input the high speed mode, the standard mode, or the high image quality mode in a "Print Mode" field on the user operation unit 5. FIG. 2 is an example where dark ink (K) and light ink (LK) are used for black for image formation. However, the same goes for the case where dark ink and light ink are used for a color other than black.

The save mode setting unit 15 achieves a save mode setting function. The save mode setting unit 15 sets any of the plurality of print modes selected in the print mode selector 13 to the save mode. The save mode changes usage volume of dark ink and light ink in the selected print mode to reduce the total ink cost.

The save mode setting unit 15 of this the embodiment, as illustrated in FIG. 2, causes the user to specify and input the save mode to the "Save Mode" field on the user operation unit 5.

The reduction rate setting unit 17 achieves an amount of reduction setting function and causes specification of reduced monetary sum by the save mode. In this embodiment, input of cost reduction rate indirectly specifies the reduced monetary sum.

Specifically, as illustrated in FIG. 2, the reduction rate setting unit 17 causes the user to input a value to the "Cost Reduction Rate" field on the user operation unit 5. However, a reduced monetary sum may be directly input instead of the cost reduction rate. The cost reduction rate or the reduced monetary sum can be input for each tone described later.

The unit price setting unit 19 achieves a unit price setting function and causes setting of unit prices of dark ink and light ink. In this embodiment, as illustrated in FIG. 2, the unit price setting unit 19 causes the user to input a value to the "K" and "LK" fields in the "Ink Unit Price" area on the user operation unit 5.

As the ink unit price may employ prices of dark/light ink. However, a price ratio of a dark ink to a light ink may also be employed. Input of the unit price of ink is not specifically limited; however, if indicated on an ink cartridge or a similar component, the user can input the unit price with reference to the indication.

The setting screen for the save mode in FIG. 2, the End button is provided. Selection of the End button completes the save mode setting. The setting information of save mode may be held by a memory device such as a hard disk.

Control Unit

Execution of the save mode program (the dark/light color material setting program) causes the control unit to function as a CMYK conversion unit 21, a dark/light data decomposition unit 23, and an output image generating unit 25 to achieve a table generation function and an output image data generation function.

When the print job input via the data transmission/reception unit 3 is a color image, the CMYK conversion unit 21 color-converts a color space into CMYK color space for the image forming apparatus 1. The color conversion is performed using a color conversion table (GLUT) or a similar table. Before the color conversion, the print job is, for example, interpreted. The operation is the same as the operation in ordinary processes, and therefore the description will not be further elaborated here.

The dark/light data decomposition unit 23 achieves a dark/light data decomposition function and decomposes print image data into dark data (K) and light data (LK). Regardless of a non-save mode or the save mode, the dark/light data decomposition unit 23 functions for generating output image data. Decomposition into dark data and light dark is performed based on the dark/light table in the non-save mode or the tone reproduction table in the save mode.

Specifically, the dark/light data decomposition unit 23 achieves a print density conversion function. The dark/light data decomposition unit 23 decomposes print image data into dark data and light data according to usage volumes of dark/light inks based on the dark/light table or the tone reproduction table and passes the decomposed data to the output image generating unit 25.

The output image generating unit 25 generates definitive output image data based on the dark/light data through a gamma correction and screen processing. The generated output image data is passed to the print engine 9. The print engine 9 forms an image according to usage volumes of dark/light inks determined with the output image data.

The above-described dark/light data decomposition unit 23 includes a dark/light table selector 27 for the output image data generation function and a table information managing unit 29 and a tone reproduction table generating unit 31 for the table generation function.

The dark/light table selector 27 achieves a reference usage volume selection function as a reference usage volume selector and selects a reference usage volumes of dark/light inks according to the print mode selected in the user operation unit 5. Specifically, in the non-save mode, the dark/light table selector 27 selects a dark/light table of the print mode selected according to the setting in the user operation unit 5. FIG. 3 is a tabular diagram illustrating an exemplary dark/light table.

In the dark/light table, the reference usage volumes of the dark/light inks (dark ink and light ink) and a sum of both (a dark/light sum) as the total ink usage volume at each tone (a tone value) after CMYK conversion are set for each of the high image quality mode, the standard mode, and the high speed mode.

The dark/light data decomposition unit 23 selects a table corresponding to the print mode selected from the dark/light table as a dark/light table used for image formation.

The dark/light table selector 27 achieves a usage volume after reduction selection function as a usage volume after reduction selector. The dark/light table selector 27 selects the usage volume after reduction of the dark/light ink corresponding to the print mode selected in the user operation unit 5 in the save mode. That is, the dark/light table selector 27 selects the tone reproduction table, instead of the dark/light table, of when the selected print mode is in the save mode. The details of the tone reproduction table will be described later.

The table information managing unit 29 manages information on the dark/light table. In this embodiment, the table information managing unit 29 achieves a reference cost obtaining function and a minimum monetary-sum extraction function as a reference cost obtaining unit and a minimum monetary-sum extraction unit, respectively.

The table information managing unit 29 manages a monotonic increase flag. The monotonic increase flag indicates whether the total ink usage volume (the dark/light sum) is monotonically increased corresponding to an increase of tone in the dark/light table in each print mode or not. In the dark/light table of FIG. 3, the total ink usage volume in the high image quality mode is 255 at the tone value 128 and 248 at the tone value 144; therefore, this usage volume is not a monotonic increase. In contrast, in the standard mode and the high speed mode, the total ink usage volume monotonically increases. The table information managing unit 29 manages the monotonic increase flags for these ink usage volume.

The table information managing unit 29 obtains a reference cost from unit prices of dark ink and light ink with respect to reference usage volumes of the dark ink and the light ink in all print modes set in the dark/light table and manages the data. The reference cost can be obtained when the unit prices of dark ink and light ink are input to the user operation unit 5. The minimum monetary sum at each tone is extracted from the obtained reference cost.

Figure 5A:
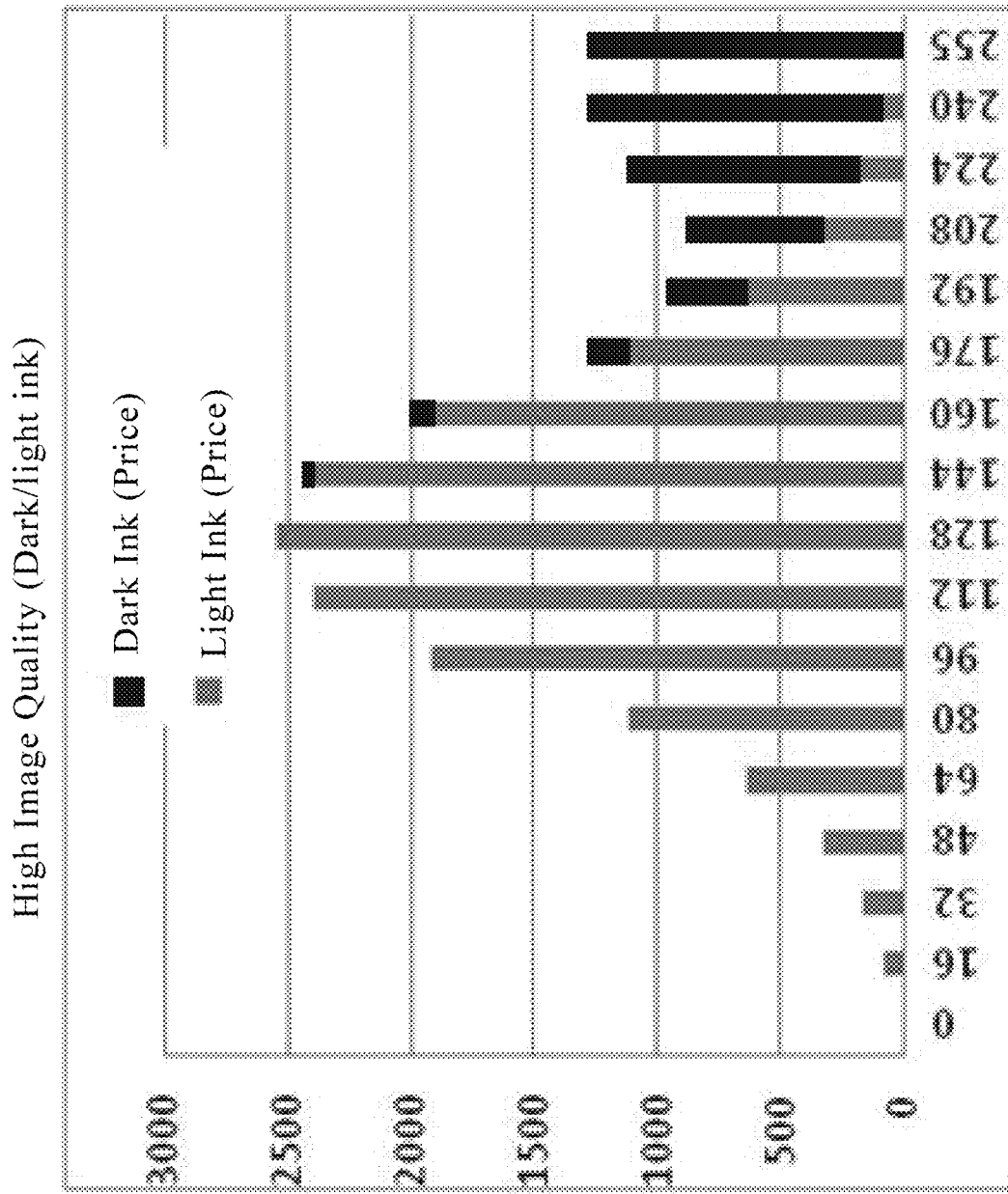
FIGS. 5A to 5C are graphical diagrams illustrating graphs where the cost table is plotted according to the embodiment.
Figure 5B:
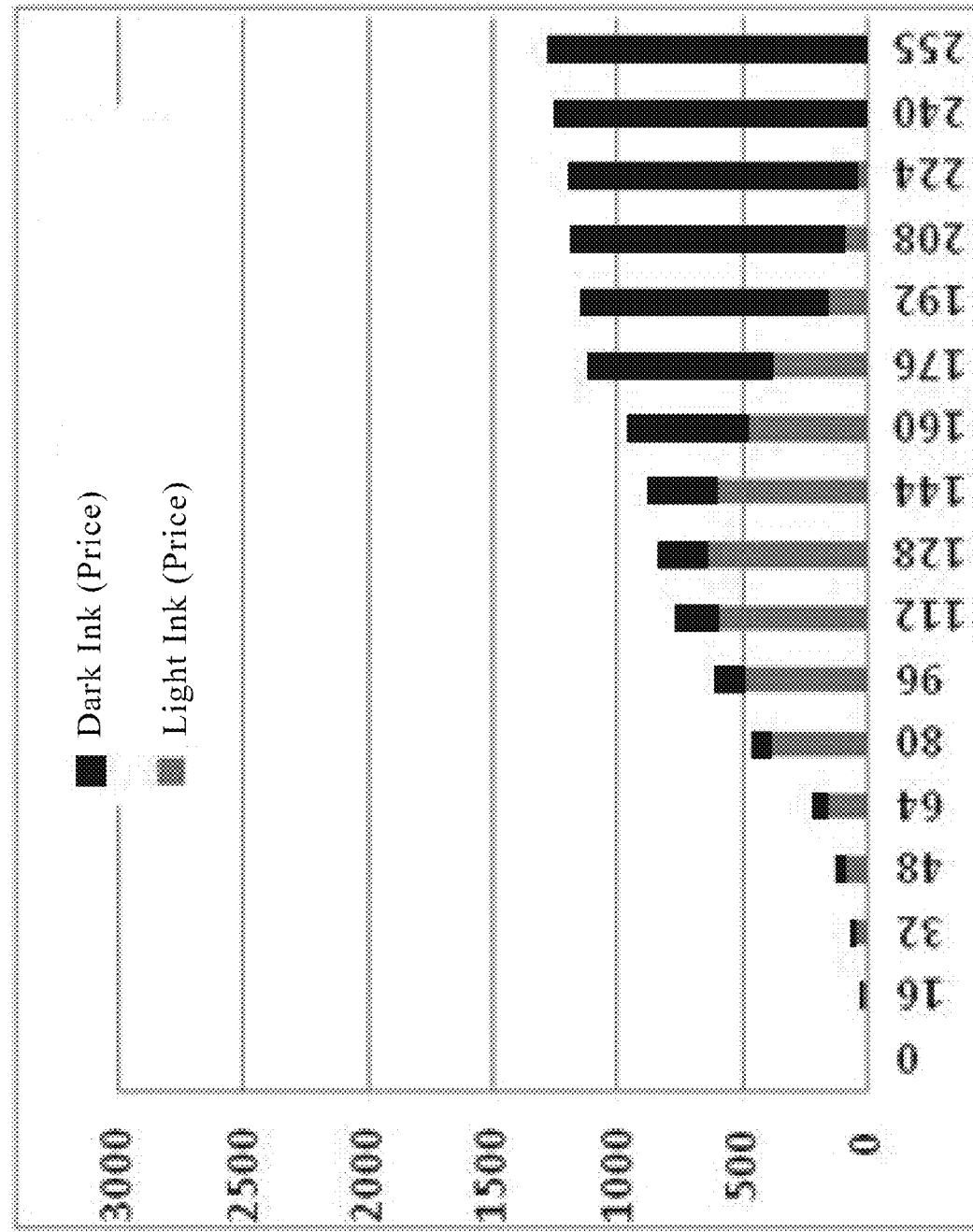
Figure 5C:
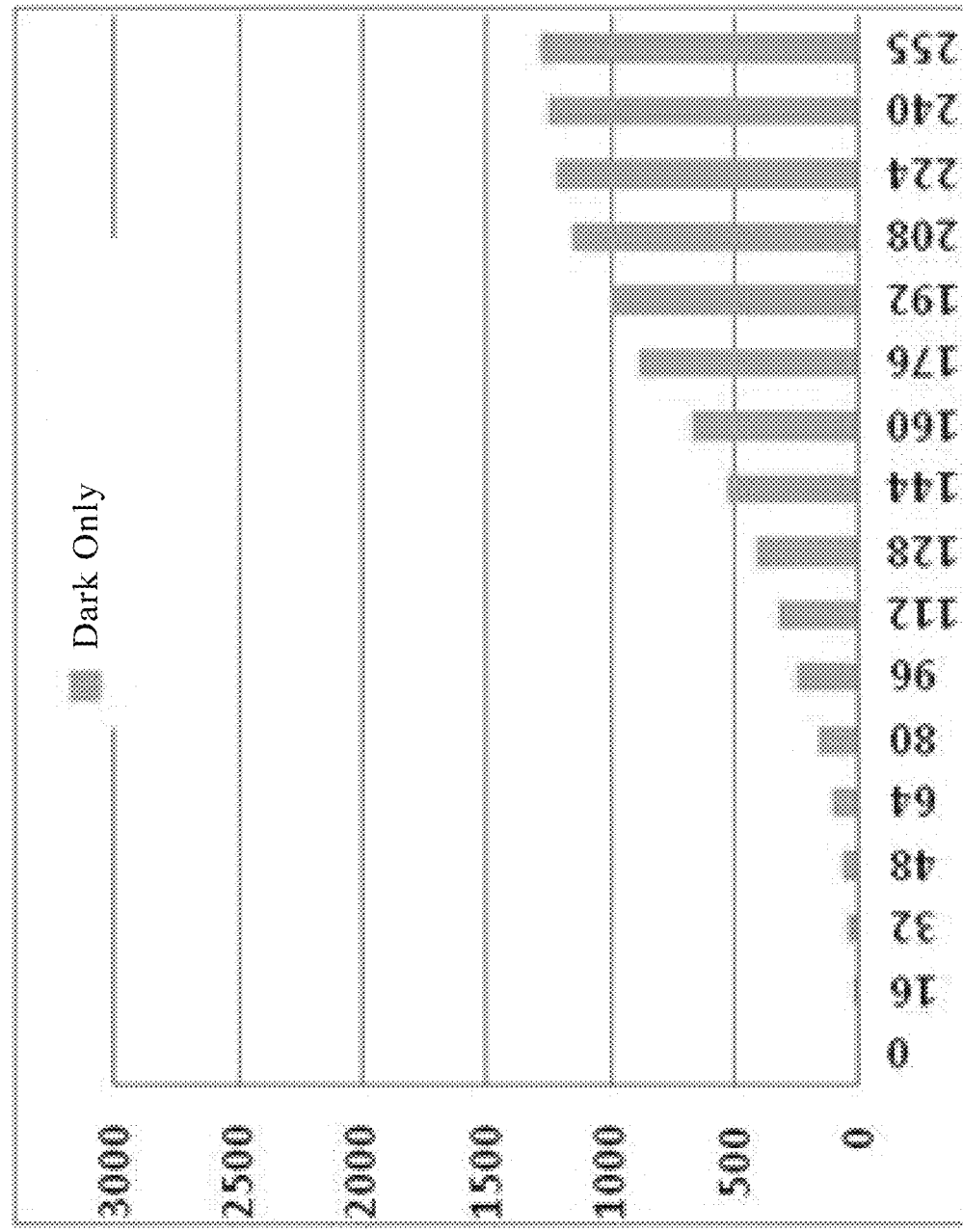

The table information managing unit 29 of this embodiment creates a cost table for reference cost and minimum monetary sum. The cost table can be held in a storage device such as a hard disk. FIG. 4 is a schematic diagram illustrating an exemplary cost table. FIGS. 5A to 5C are graphical diagrams illustrating graphs where the cost table is plotted. FIG. 4 and FIGS. 5A to 5C illustrate an example where a unit price of light ink is ten yen and a unit price of dark ink is five yen.

The cost table includes a reference cost found by multiplying the reference usage volumes of dark/light inks in the dark/light table by the unit price (light ink and dark ink) and the sum of both as the total ink cost (dark/light sum). In this cost table, the minimum monetary sum of dark and light among all the print modes at each tone is extracted to the right-most column in the table as minimum monetary sum.

In extraction of minimum monetary sum, if the minimum monetary sum does not monotonically increase as the tone increases, the table information managing unit 29 reduces the minimum monetary sum at the non-monotonic increase section so as to make a monotonic increase. This ensures restricting a local increase and reduction in process of minimum monetary sum.

In this embodiment, the minimum monetary sum at the non-monotonic increase section is reduced such that a difference between before and after the minimum monetary sum becomes 0. In the example of FIG. 4, since the total ink cost at the tone value 192 (the dark/light sum) is 960 and the total ink cost at the tone value 208 is 880, the total ink cost at the tone value 192 is set to be 880.

The tone reproduction table generating unit 31 achieves a usage volume setting function as a usage volume setting unit. That is, the tone reproduction table generating unit 31 generates a tone reproduction table in the save mode. When, for example, a print mode and a cost reduction rate are input to the user operation unit 5 in addition to an ink unit price, the tone reproduction table generating unit 31 can generate the tone reproduction table of the at least selected print mode.

This embodiment generates the tone reproduction table of all the print modes. In this case, if only the cost reduction rate is input in addition to the ink unit price, the tone reproduction table can be generated. Timing of generating the tone reproduction table is not specifically limited. However, the time when the save mode is actually specified on the user operation unit 5, when the print job is received in addition to this specification, or similar timing may be set as the timing.

The tone reproduction table generating unit 31 obtains the post-reduction cost where reduced monetary sum by the save mode is subtracted from the minimum monetary sum in the cost table. That is, the reduced monetary sum at the cost reduction rate input to the user operation unit 5 is subtracted from the minimum monetary sum in the cost table. FIG. 6 is a tabular diagram illustrating a save mode cost table at the post-reduction cost.

In this embodiment, as illustrated in FIG. 2, since the cost reduction rate is 20%, the save mode cost table is generated with the post-reduction cost found by multiplying the minimum monetary sum in the cost table in FIG. 4 by 0.8. The generated save mode cost table is held in the storage device such as a hard disk.

Figure 7:
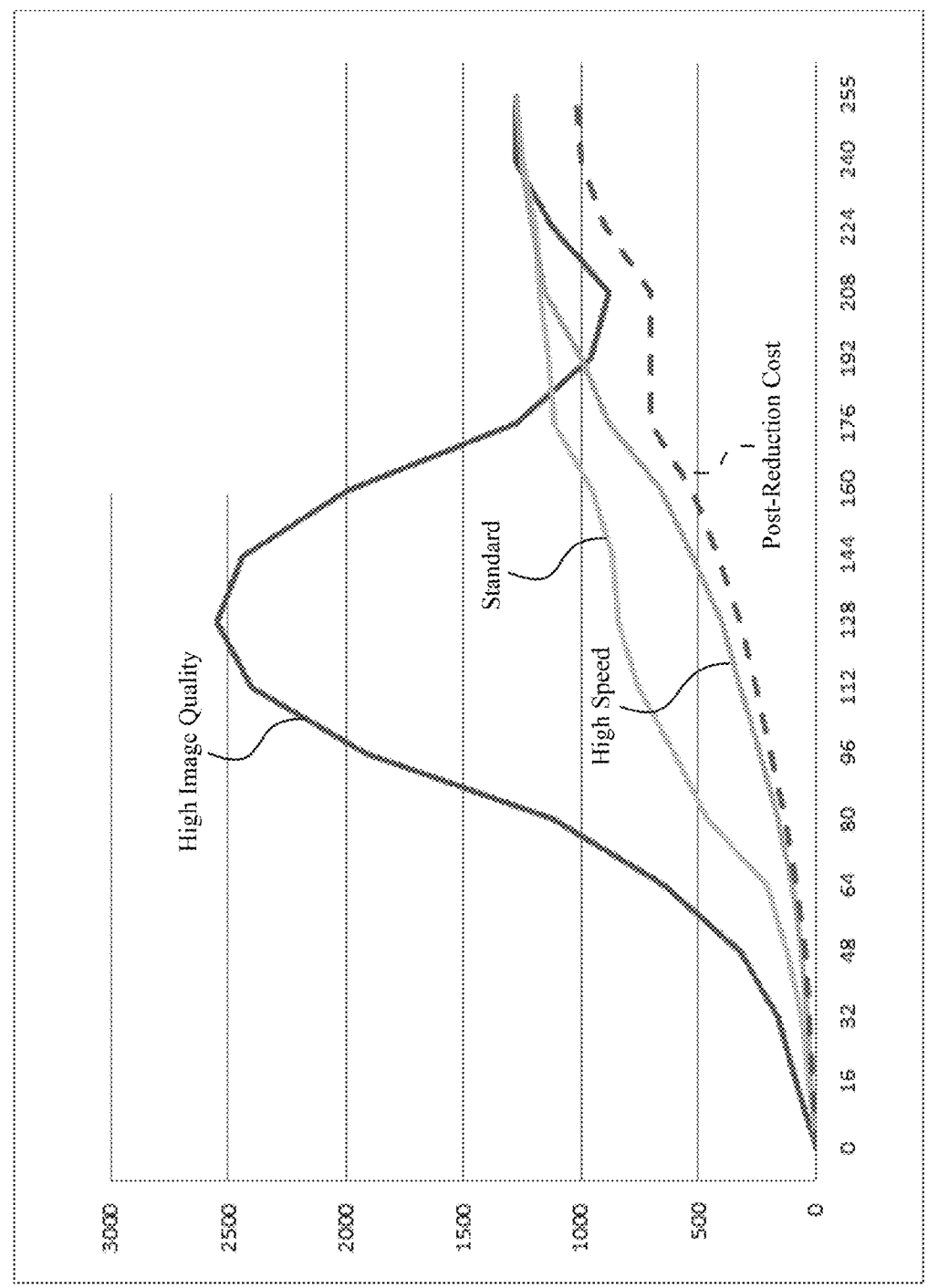
FIG. 7 is a graphic diagram comparing a post-reduction cost in the save mode cost table with a reference cost in each print mode in the cost table according to the embodiment.

FIG. 7 is a graphical diagram comparing the post-reduction cost in the save mode cost table in FIG. 6 with the reference cost in each print mode in the cost table in FIG. 4. As illustrated in FIG. 7, the post-reduction cost can be reduced with respect to the reference costs in all the print modes.

The reference usage volumes of the reference cost in the print mode corresponding to the post-reduction cost are set as usage volumes of dark ink and light ink in the save mode (the tone reproduction table is generated).

At this time, when the reference usage volume in the print mode does not monotonically increase as the tone increases, the tone reproduction table generating unit 31 applies the reference usage volume in another print mode where the reference usage volume monotonically increases instead of the reference usage volume of the print mode.

Specifically, the monotonic increase flag is referred. For example, for non-monotonic increase in the high image quality mode as shown in FIG. 3 and FIG. 4, the above-described tone reproduction table is generated based on the reference usage volume of the standard mode that monotonically increases. This ensures the restricted local increase and reduction in the total ink cost or the total ink usage volume in the save mode.

The tone reproduction table thus generated is held in a storage device such as a hard disk. If an existing tone reproduction table is present, it may be updated by the generated tone reproduction table.

Figure 8:
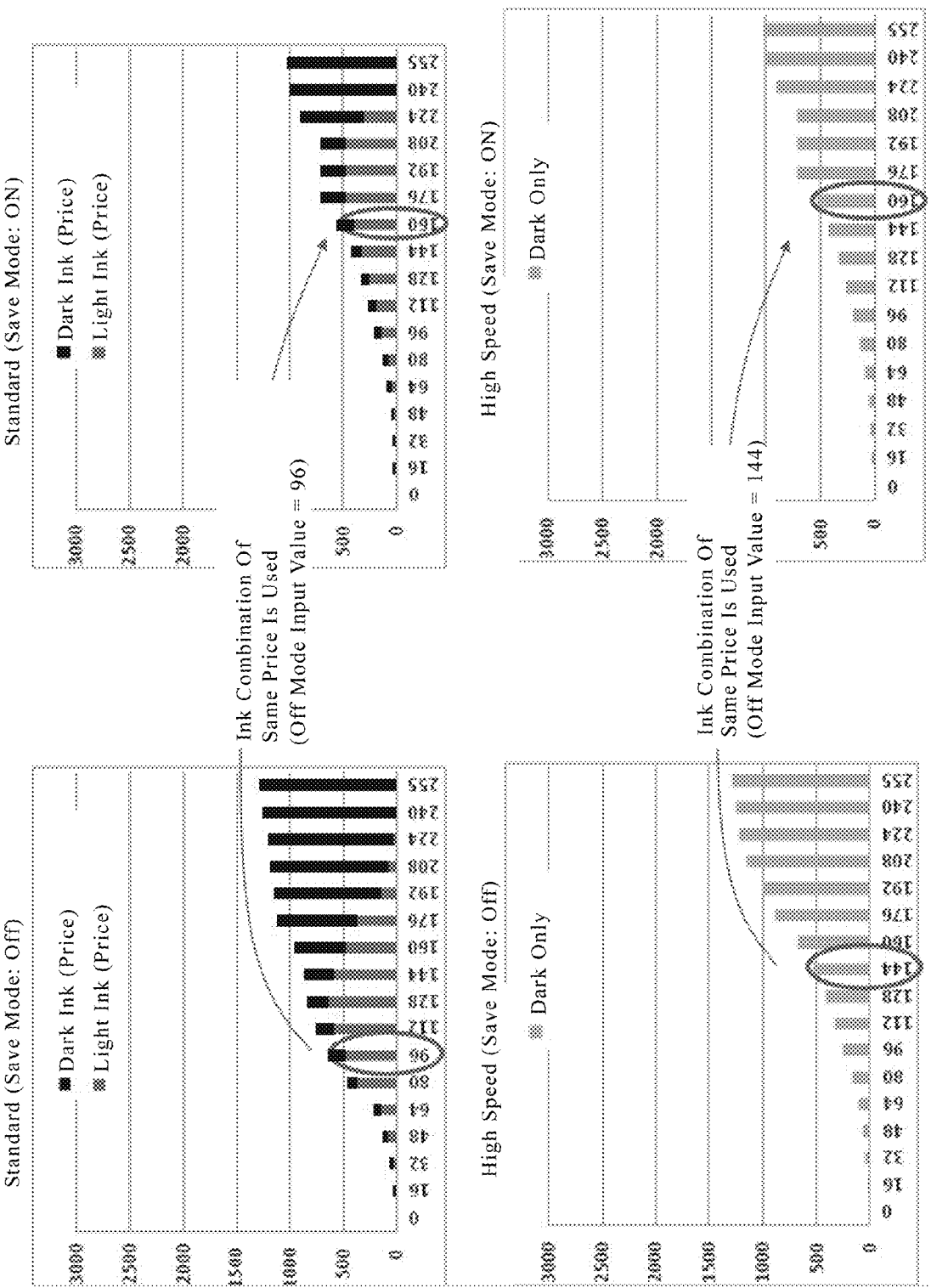
FIG. 8 is graphical diagram illustrating an exemplary correspondence relationship between the reference cost and the post-reduction cost of dark/light ink according to the embodiment.

FIG. 8 is graphical diagram illustrating an exemplary correspondence relationship between the reference cost and the post-reduction cost of dark/light ink. FIG. 9 is a table illustrating an exemplary tone reproduction table.

FIG. 8 illustrates the reference costs at the left side and the costs after reduction at the right side. FIG. 8 illustrates a correspondence relationship between the reference cost and the post-reduction cost in the standard mode (when the high image quality mode and the standard mode are in the save mode) at the upper side. FIG. 8 illustrates a correspondence relationship between the reference cost and the post-reduction cost in the high speed mode (when the high speed mode is in the save mode) at the lower side.

As illustrated in the upper side of FIG. 8, for example, if the reference cost at the tone value 96 corresponds to the post-reduction cost at the tone value 160 in the standard mode (both are the same), based on the cost table in FIG. 4 and the dark/light table in FIG. 3, the reference usage volumes at the tone value 96 are set as the usage volumes of dark/light inks at the tone value 160 in the save mode. If the reference cost corresponding to the post-reduction cost does not exist in the cost table, the reference cost can be obtained by interpolation calculation or a similar method.

Similarly to this, as illustrated in the lower side of FIG. 8, for example, if the reference cost at the tone value 144 corresponds to the post-reduction cost at the tone value 160 in the high speed mode (both are the same), based on the cost table in FIG. 4 and the dark/light table in FIG. 3, the reference usage volumes at the tone value 144 are set as the usage volumes of dark/light inks at the tone value 160 in the save mode. Thus, as illustrated in FIG. 9, the tone reproduction table for each print mode is generated.

Figure 10A:
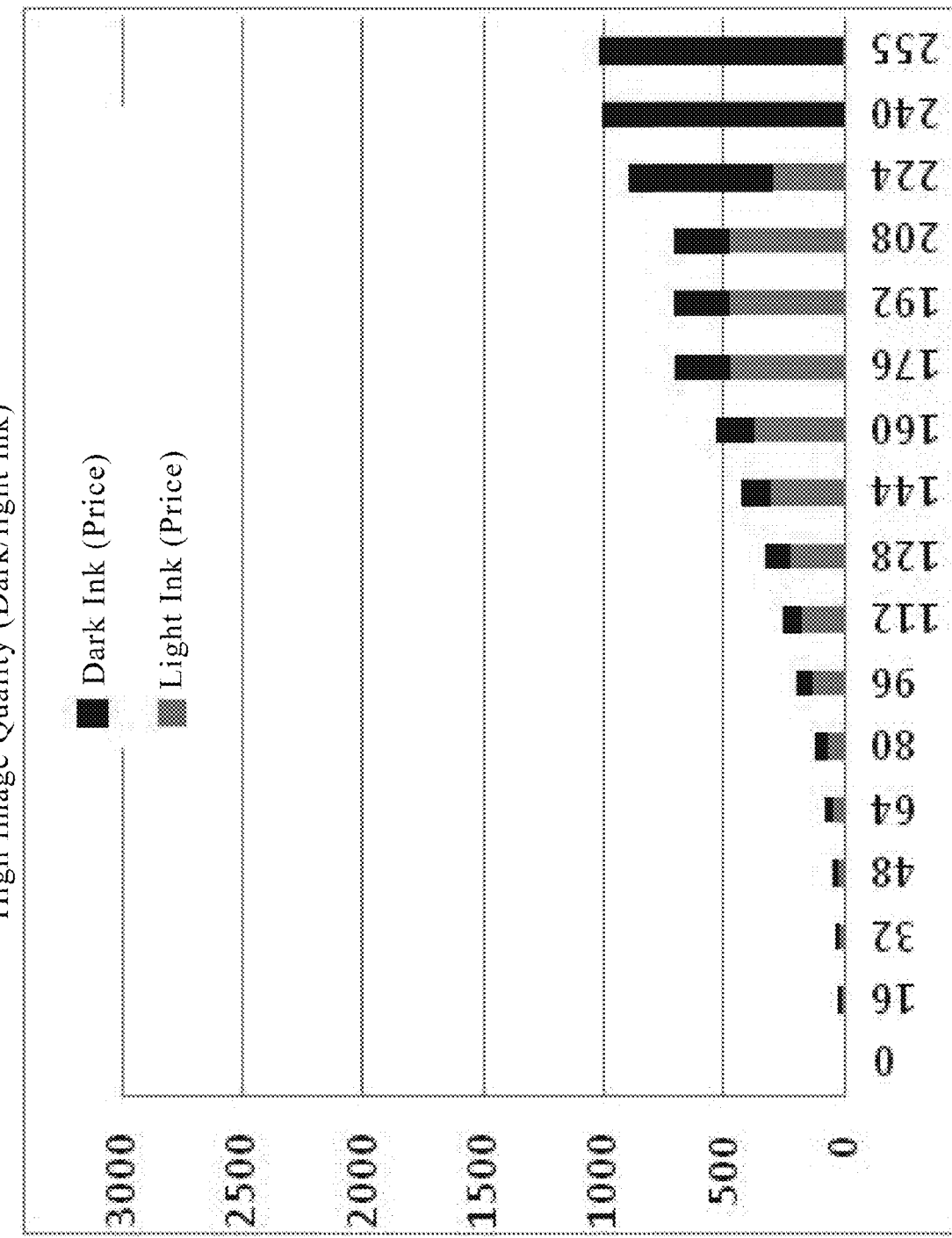
FIGS. 10A to 10O are graphical diagrams illustrating the post-reduction cost in each print mode based on the tone reproduction table according to the embodiment.
Figure 10B:
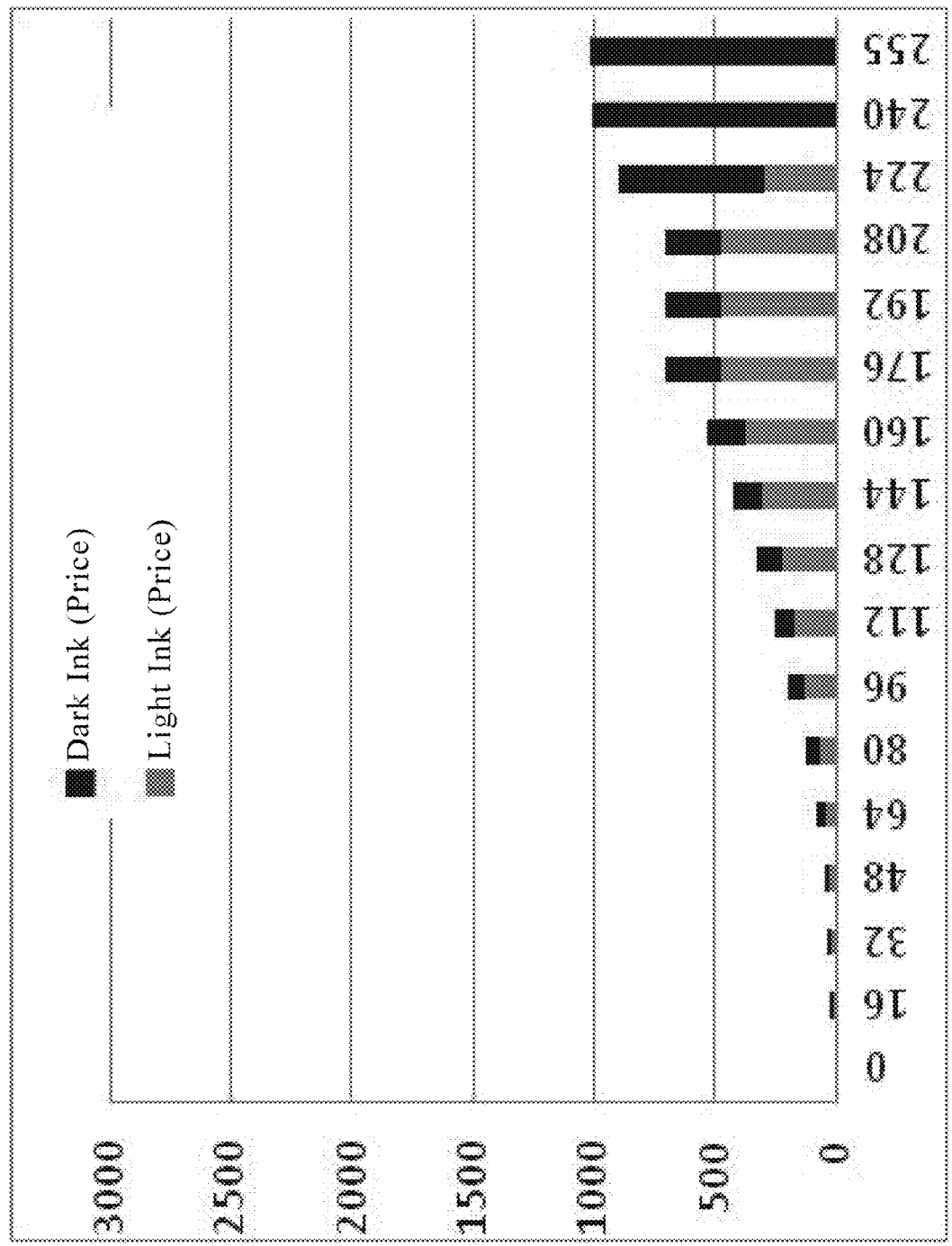
Figure 10C:
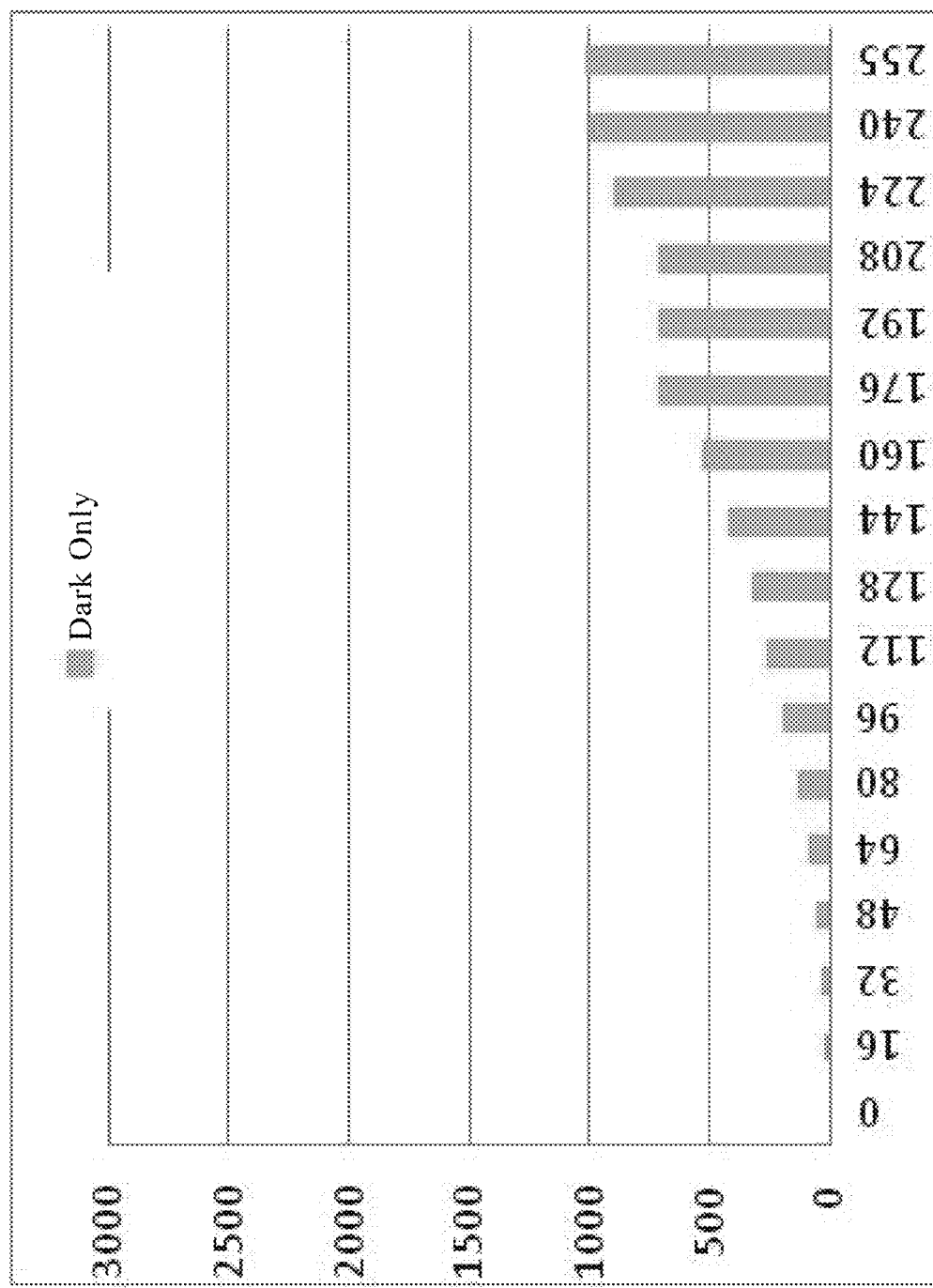

FIGS. 10A to 10C are graphical diagrams illustrating the post-reduction cost in each print mode based on the tone reproduction table. As illustrated in FIGS. 10A to 10C, the tone reproduction table is based on the post-reduction cost. Accordingly, the total ink usage volume can be reliably reduced compared with the graphs of cost table in FIGS. 5A to 5C.

Tone Reproduction Table Generation Process

Figure 11:
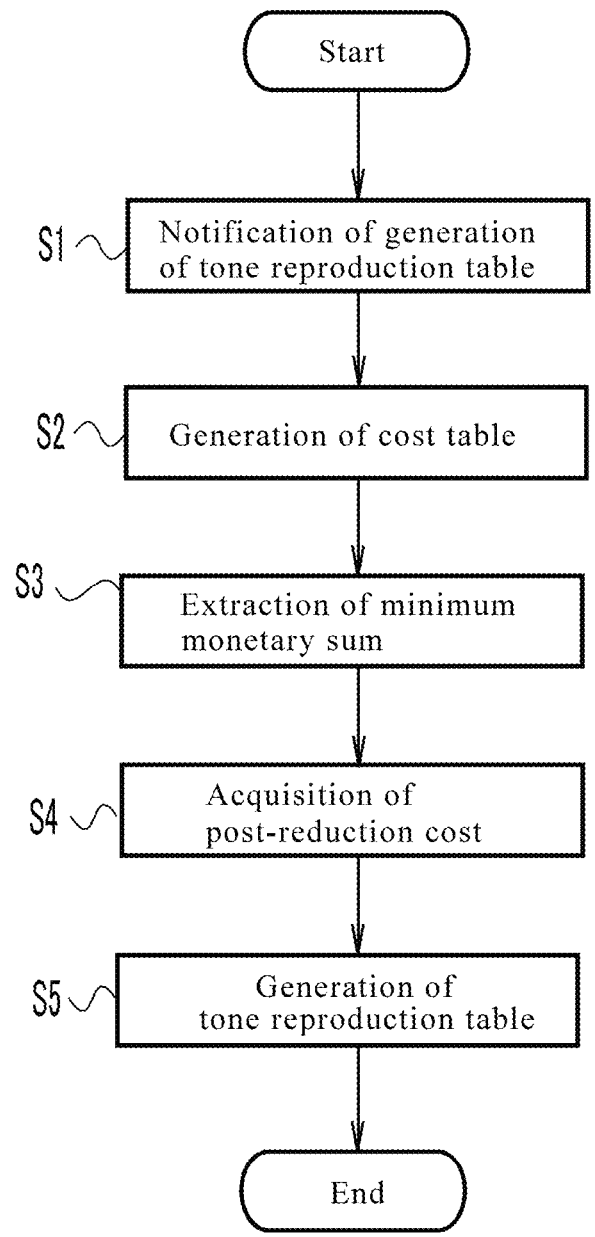
FIG. 11 is a flowchart of a tone reproduction table generation process according to the embodiment.
Figure 12A:
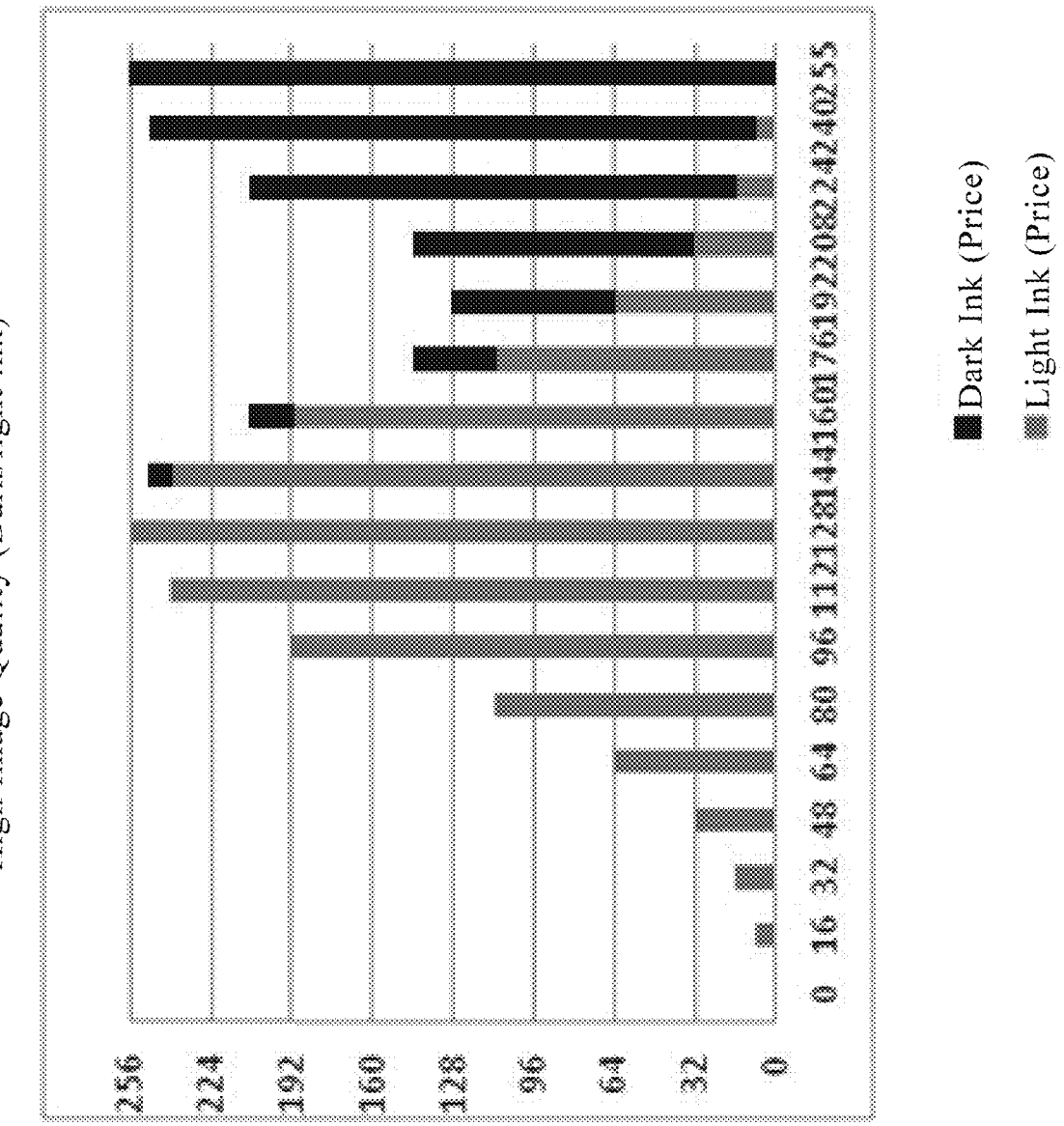
FIGS. 12A to 12C are graphical diagrams illustrating usage volumes of dark/light inks in each print mode according to a conventional example.
Figure 12B:
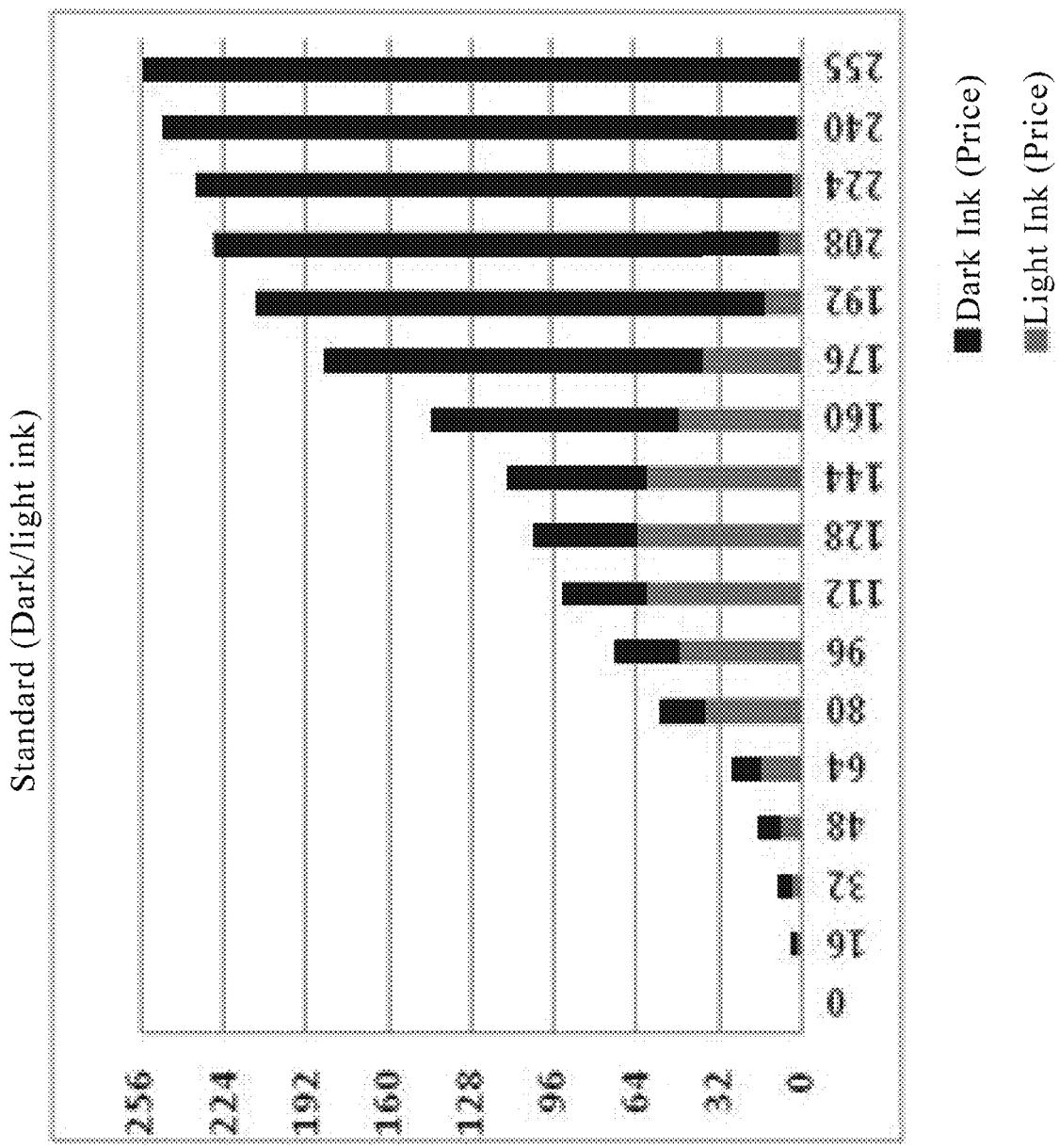
Figure 12C:
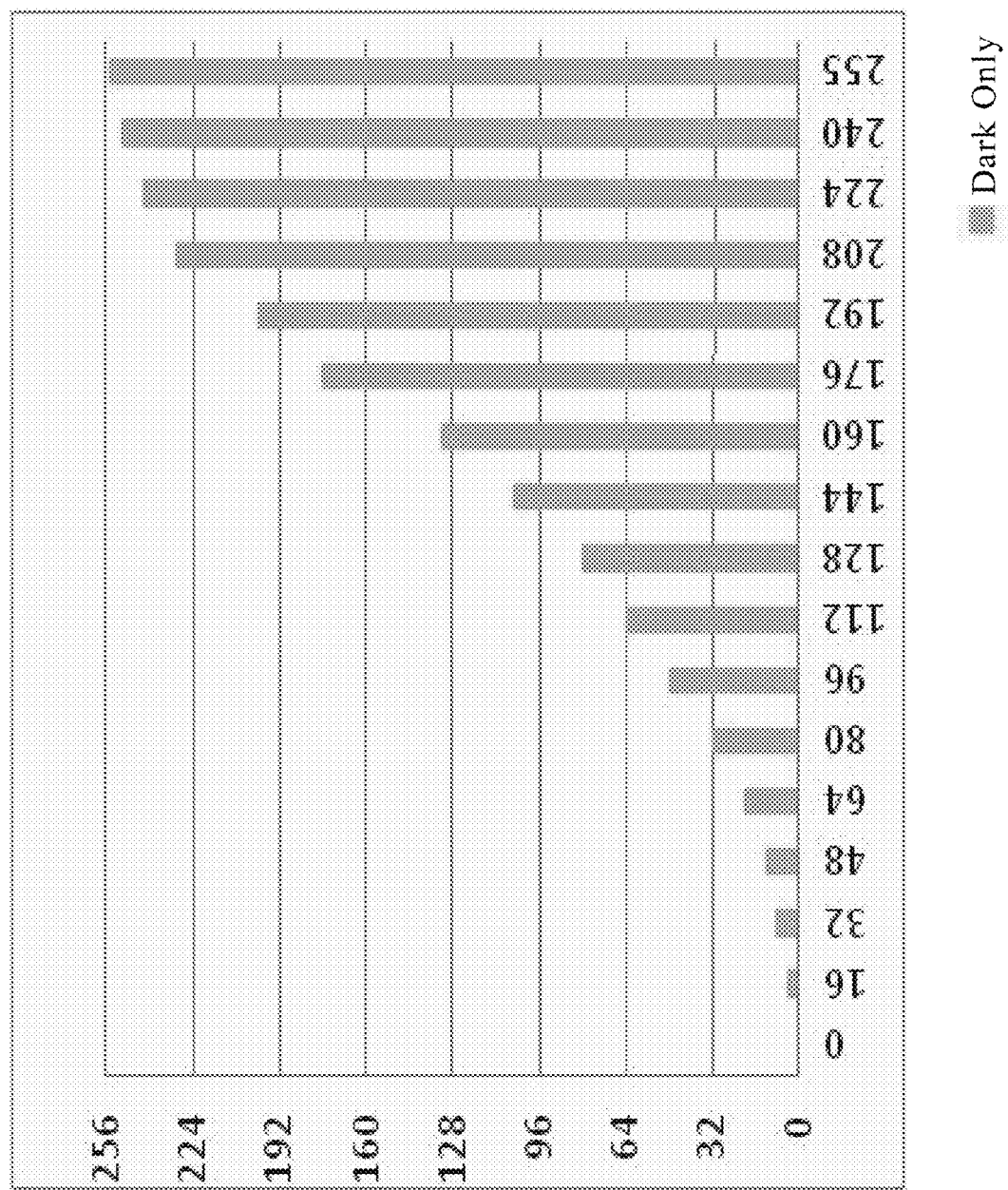
Figure 13:
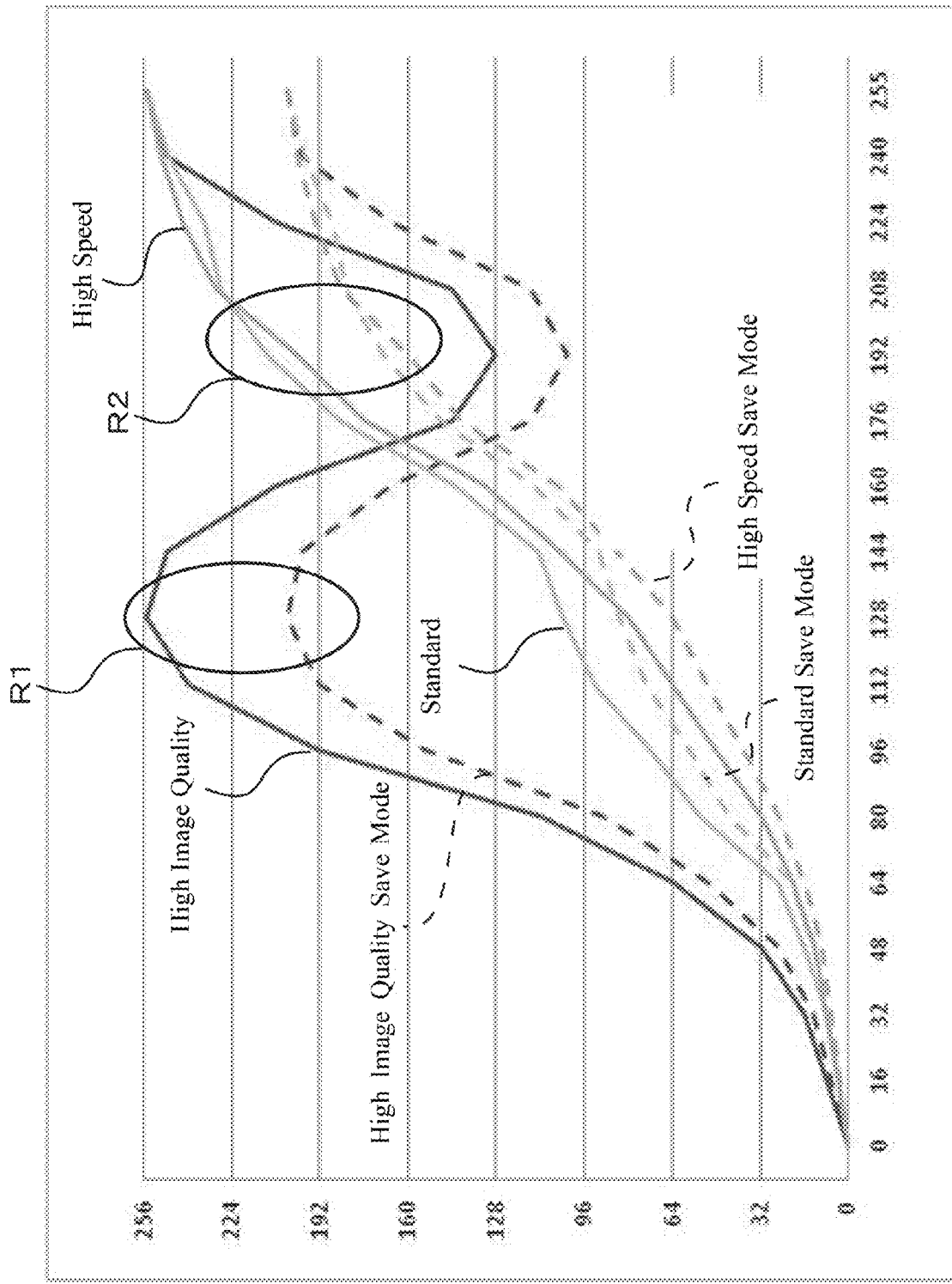
FIG. 13 is a graphical diagram illustrating extraction of the total ink usage volumes of dark/light inks according to the conventional example.

FIG. 11 is a flowchart of a tone reproduction table generation process. In this embodiment, as illustrated in the setting screen of FIG. 2, the save mode is specified. An example employs that a unit price of dark ink is five yen and a unit price of light ink is ten yen, and the save mode is set with a cost reduction rate of 20%.

Start of the flowchart illustrated in FIG. 11 is not specifically limited. However, in the case where the above-described settings are configured at, for example, start of the image forming apparatus 1 and the existing tone reproduction table exists, the flowchart is started when any of the unit price of dark ink: five yen, the unit price of light ink: ten yen, the cost reduction rate: 20%, or a similar setting is changed.

First, in Step S1, "notification of generation of tone reproduction table" is performed. In this process, the table information managing unit 29 receives notification of generation of tone reproduction table at a process at startup or from the user operation unit 5 side with save mode set.

Thus, Step S1 is completed, and the process proceeds to Step S2.

In Step S2, "generation of cost table" is performed. In this process, the reference cost (light ink and dark ink) and the sum of both as the total ink usage volume (dark/light sum) are obtained to generate the cost table in FIG. 4. The reference cost is found by multiplying the reference usage volumes of dark/light inks in the dark/light table by the unit price by the table information managing unit 29.

Thus, Step S2 is completed, and the process proceeds to Step S3.

In Step S3, "extraction of minimum monetary sum" is performed. That is, the table information managing unit 29 extracts the minimum monetary sum at each tone from the created cost table as the right-most column in FIG. 4. At this time, as described above, the minimum monetary sum that does not monotonically increase corresponding to the increase of the tone value, which is the minimum monetary sum at the non-monotonic increase section at the tone value 192 in the example of FIG. 4, is set to 880 so as to make a monotonic increase.

Thus, Step S3 is completed, and the process proceeds to Step S4.

In Step S4, "obtainment of a post-reduction cost" is performed. That is, the table information managing unit 29 obtains the post-reduction cost by multiplying the minimum monetary sum in the cost table of FIG. 4 by 0.8, which is a value corresponding to the set reduction cost, 20%. The table information managing unit 29 creates the save mode cost table of FIG. 6 corresponding to the post-reduction cost.

Thus, Step S4 is completed, and the process proceeds to Step S5.

In Step S5, "generation of a tone reproduction table" is performed. First, the tone reproduction table generating unit 31 checks existence of the monotonic increase flag in each print mode. Next, the tone reproduction table generating unit 31 sets the reference usage volume of the reference cost in each print mode corresponding to the post-reduction cost in the save mode cost table as usage volume of dark ink and light ink in the save mode. Thus, the tone reproduction table in FIG. 9 is generated.

At this time, to the high image quality mode without the monotonic increase flag, the reference usage volume in the standard mode whose usage volumes of dark/light inks is approximate to the usage volumes of dark/light inks of the high image quality mode is applied. Thus, the tone reproduction table that is the same as the standard mode is employed.

Termination of Step S5 completes the tone reproduction table generation process in this embodiment.

If the existing tone reproduction table exists, whether the setting condition of the save mode is changed or not is determined. It is only necessary not to generate the tone reproduction table as long as the tone reproduction table is not changed.

The tone reproduction table generation process may be partially performed corresponding to a partial change in the setting condition of the save mode. For example, if the cost reduction rate alone is changed, since the minimum monetary sum based on the ink unit price is not changed, the process may be performed from Step S4.

Effect of Embodiment 1

This embodiment provides an image forming apparatus 1 that reproduces tone with a dark ink and a light ink of different print density. The image forming apparatus 1 has a plurality of print modes where usage volumes of the dark ink and the light ink are different at identical tone. The image forming apparatus 1 includes the save mode setting unit 15, a reference cost obtaining unit (a table information managing unit) 29, a minimum monetary-sum extraction unit (a table information managing unit) 29, and a usage volume setting unit (a tone reproduction table generating unit) 31. The save mode setting unit 15 is configured to establish a save mode where usage volumes of the dark ink and the light ink for any of the plurality of print modes are changed to reduce total ink cost. The reference cost obtaining unit 29 is configured to obtain a reference cost from unit prices of the dark ink and light ink with respect to reference usage volumes for the dark ink and the light ink set per tone in the plurality of print modes. The minimum monetary-sum extraction unit 29 is configured to extract a minimum monetary sum for each tone from the reference costs for the plurality of print modes. The usage volume setting unit 31 is configured to obtain a post-reduction cost where a reduced monetary sum by the save mode is subtracted from the minimum monetary sum. The usage volume setting unit 31 is configured to set reference usage volume as usage volumes for the dark ink and the light ink in the save mode. The reference usage volume is obtained based on the reference costs for the image forming modes corresponding to the post-reduction cost.

Accordingly, in this embodiment, the minimum monetary sum is extracted at each tone among all the reference costs of the plurality of print modes in the non-save mode, and the post-reduction cost in the save mode is obtained based on the minimum monetary sum. Accordingly, the post-reduction cost does not become higher than the reference cost in any print mode in the non-save mode. That is, this ensures the lower post-reduction cost than any print mode in the non-save mode.

In this embodiment, the reference usage volumes of the reference cost in the print mode corresponding to the post-reduction cost are set as the usage volumes of the dark/light inks in the save mode. Accordingly, the tone reproduction can be performed at the post-reduction cost regardless of which print modes are set to the save mode.

As a result, in this embodiment, the total ink cost can be reliably reduced regardless of which print modes are set to the save mode. This reliably ensures the reduced total ink cost compared with the other non-save-mode print modes.

In this embodiment, the usage volumes of dark/light inks in the save mode are set based on the reference usage volumes in the non-save mode. This ensures the reduced deterioration of tone reproducibility.

In the case where the minimum monetary sum does not monotonically increase as the tone increases, the table information managing unit 29 reduces the minimum monetary sum at the non-monotonic increase section so as to make a monotonic increase.

In view of this, in this embodiment, even when the usage volumes of dark/light inks in the save mode are set definitively from the minimum monetary sum, the minimum monetary sum monotonically increases so as to improve the tone reproducibility.

In the case where the reference cost of the print mode does not monotonically increase as the tone increases, the tone reproduction table generating unit 31 employs the reference cost in another print mode where the reference cost monotonically increases instead of the reference cost.

Therefore, in this embodiment, the reference usage volume that becomes a base of setting definitive usage volumes of the dark/light inks in the save mode are set to be monotonically increased, thus improving tone reproducibility.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
an image forming unit configured to reproduce tones with dark-color material including dark-cyan, magenta, yellow and black inks and light-color material including light-cyan, light magenta and gray inks, the dark-color material and light-color material differing in print density, the image forming unit operating in a plurality of image forming modes where in which printing usage volumes of the dark color material and the light-color material are different at identical tone, the plurality of image forming modes including (1) a high image-quality mode in which printing usage volume of the light-color material inks by the image forming unit is relatively large, (2) a standard mode in which printing usage volume of the light-color material inks is reduced compared with printing usage volume in the high image-quality mode, by substitution of dark-color material usage volume for light-color material usage volume so as to relatively reduce light-color material usage volume, and (3) a high speed mode in which dark-color material alone is used;
a control unit including a central processing unit and associated memory, the memory storing a save-mode program; and
a user operation unit having a user-operable operation unit controller including a processor and an associated user-input device, wherein the processor executing, by user designation through the user-input device, the save-mode program causes:
the user operation unit to function as
a save mode setting unit putting the image forming unit into a save mode in which the printing usage volumes of the dark-color material inks and the light-color material inks for any of the plurality of image forming modes are changed so as to reduce total color-material cost, and the control unit to function as
a table information managing unit including a dark/light table containing reference usage volumes established on a per-tone basis for the dark-color material and light-color material in the high image-quality mode, the standard mode, and the high speed mode,
a reference cost obtaining unit configured to obtain reference costs from unit prices of the dark-color material and light-color material with respect to the reference usage volumes,
a minimum monetary-sum extraction unit configured to extract a minimum monetary sum for each tone from the reference costs for the plurality of image forming modes, and
a usage volume setting unit configured to
obtain a post-reduction cost whereby a monetary sum reduced by the save mode is subtracted from the minimum monetary sum, and establish the reference usage volumes as printing usage volumes for the dark-color material and the light-color material in the save mode, the reference usage volumes being obtained based on the reference costs for the image forming modes corresponding to the post-reduction cost,
wherein in cases where the minimum monetary sums do not monotonically increase in accordance with increase in tone value, the minimum monetary-sum extraction unit reduces the minimum monetary sums where the sums do not monotonically increase, so as to make the minimum monetary sums monotonically increase.

2. The image forming apparatus according to claim 1, wherein, in cases where reference usage volumes for the high image-quality mode do not monotonically increase in accordance with increase in tone value, the usage volume setting unit employs, instead of the high image-quality mode reference usage volumes, reference usage volumes for the standard mode where the standard mode reference usage volumes monotonically increase in accordance with increase in tone value.

3. The image forming apparatus according to claim 1, wherein, in cases where reference usage volumes for the high image-quality mode do not monotonically increase in accordance with increase in tone value, the usage volume setting unit employs, instead of the high image-quality mode reference usage volumes, reference usage volumes for the standard mode where the standard mode reference usage volumes monotonically increase in accordance with increase in tone value.

4. A non-transitory computer-readable recording medium storing an image forming program for an image forming unit configured to reproduce tones with dark-color material including dark-cyan, magenta, yellow and black inks and light-color material including light-cyan, light magenta and gray inks, the dark-color material and light-color material differing in print density, the image forming unit operating in a plurality of image forming modes in which printing-usage volumes of the dark-color material and the light-color material are different at identical tone, the plurality of image forming modes including (1) a high image-quality mode in which printing usage volume of the light-color material inks by the image forming unit is relatively large, (2) a standard mode in which printing usage volume of the light-color material inks is reduced compared with printing usage volume in the high image-quality mode by substitution of dark-color material usage volume for light-color material usage volume so as to relatively reduce light-color material usage volume, and (3) a high speed mode in which dark-color material alone is used, the image forming program causing a computer to function as:

- a save mode setting unit putting the image forming unit into a save mode in which the printing usage volumes of the dark-color material inks and the light-color material inks for any of the plurality of image forming modes are changed so as to reduce total color-material cost;
- a table information managing unit including a dark/light table containing reference usage volumes established on a per-tone basis for the dark-color material and light-color material in the high image-quality mode, the standard mode, and the high speed mode;
- reference cost obtaining unit configured to obtain reference costs from unit prices of the dark-color material and light-color material with respect to the reference usage volumes;
- a minimum monetary-sum extraction unit configured to extract a minimum monetary sum for each tone from the reference costs for the plurality of image forming modes; and
- a usage volume setting unit configured to obtain a post-reduction cost whereby a monetary sum reduced by the save mode is subtracted from the minimum monetary sum, and
- establish the reference usage volumes as printing usage volumes for the dark-color material and the light-color material in the save mode, the reference usage volumes being obtained based on the reference costs for the image forming modes corresponding to the post-reduction cost,
- wherein in cases where the minimum monetary sums do not monotonically increase in accordance with increase in tone value, the minimum monetary-sum extraction unit reduces the minimum monetary sums where the sums do not monotonically increase, so as to make the minimum monetary sums monotonically increase.

5. The non-transitory computer-readable recording medium according to claim 4, wherein, in cases where reference usage volumes for the high image-quality mode do not monotonically increase in accordance with increase in tone value, the usage volume setting unit employs, instead of the high image-quality mode reference usage volumes, reference usage volumes for the standard mode where the standard mode reference usage volumes monotonically increase in accordance with increase in tone value.

6. The non-transitory computer-readable recording medium according to claim 4, wherein, in cases where reference usage volumes for the high image-quality mode do not monotonically increase in accordance with increase in tone value, the usage volume setting unit employs, instead of the high image-quality mode reference usage volumes, reference usage volumes for the standard mode where the standard mode reference usage volumes monotonically increase in accordance with increase in tone value.

7. An image forming method by an image forming apparatus operating in a plurality of image forming modes in which printing-usage volumes of dark-color material and light-color material are different at identical tone, the plurality of image forming modes including (1) a high image-quality mode in which printing usage volume of the light-color material inks by the image forming unit is relatively large, (2) a standard mode in which printing usage volume of the light-color material inks is reduced compared with printing usage volume in the high image-quality mode by substitution of dark-color material usage volume for light-color material usage volume so as to relatively reduce light-color material usage volume, and (3) a high speed mode in which dark-color material alone is used, the image forming method comprising:

- reproducing tones with the dark-color material, the dark-color material including dark-cyan, magenta, yellow and black inks, and with the light-color material, the light-color material including light-cyan, light magenta and gray inks, the dark-color material and light-color material differing in print density;
- establishing a save mode in which the printing usage volumes of the dark-color material inks and the light-color material inks for any of the plurality of image forming modes are changed so as to reduce total color-material cost;
- obtaining reference costs from unit prices of the dark-color material and light-color material with respect to reference usage volumes established on a per-tone basis for the dark-color material and the light-color material in the high image-quality mode, the standard mode, and the high speed mode;
- extracting a minimum monetary sum for each tone from the reference costs for the plurality of image forming modes;
- obtaining a post-reduction cost whereby a monetary sum reduced by the save mode is subtracted from the minimum monetary sum, and establishing the reference usage volumes as printing usage volumes for the dark-color material and the light-color material in the save mode, the reference usage volumes being obtained based on the reference costs for the image forming modes corresponding to the post-reduction cost; and
- reducing minimum monetary sums where the sums do not monotonically increase, so as to make the minimum monetary sums monotonically increase, in cases where the minimum monetary sums do not monotonically increase in accordance with increase in tone value.

8. The image forming method according to claim 7 further comprising:
- employing, instead of the high image-quality mode reference usage volumes, reference usage volumes for the standard mode where the standard mode reference usage volumes monotonically increase in accordance with increase in tone value, in cases where reference usage volumes for the high image-quality mode do not monotonically increase in accordance with increase in tone value.

9. The image forming method according to claim 7 further comprising:
- employing, instead of the high image-quality mode reference usage volumes, reference usage volumes for the standard mode where the standard mode reference usage volumes monotonically increase in accordance with increase in tone value, in cases where reference usage volumes for the high image-quality mode do not monotonically increase in accordance with increase in tone value.

* * * * *